Patented Dec. 10, 1946

2,412,526

UNITED STATES PATENT OFFICE 2,412,526

COATING AGGREGATE WITH ASPHALT EMULSIONS

Paul E. McCoy, San Francisco, Calif., assignor to American Bitumuls Company, San Francisco, Calif., a corporation of Delaware No Drawing. Application August 2, 1940,
Serial No. 350,053

17 Claims. (Cl. 106—277)

This invention relates to improved bituminous emulsions useful for coating or covering various kinds of objects, to a process of making the same, and to a composition comprising an object coated with or by means of such bituminous emulsions.

It is an object of this invention to make an improved bituminous emulsion, such as an asphaltic emulsion.

It is another object of this invention to make a bituminous emulsion, such as an asphaltic emulsion, which gives a strengthened bond or increased adhesiveness between an object coated therewith and the bituminous material, especially a hydrophilic object, against the deteriorating action of water, and to provide a process for making such a bituminous emulsion.

Another object of this invention is to make a bituminous composition, such as an aggregate coated with asphalt, in which the bituminous material coated on the aggregate resists the deteriorating action of water, even when the aggregate is hydrophilic in character.

Another object of this invention is to produce a bituminous emulsion, such as an asphaltic emulsion, not only having the property of greater adhesiveness or strengthening of the bond between the bituminous material and the object coated, even when that object is hydrophilic, but also the properties of an increased drying rate and improved mixing ability, as hereinafter more specifically pointed out.

Other and further important objects of this invention will become apparent from the description which follows and from the appended claims.

In the coating or covering of various objects with bituminous materials or bituminous compositions with or by means of a bituminous emulsion such as an asphaltic emulsion, for example, it has been found that the bituminous material may not readily coat many substances, or, if it does coat them, the bond or the adhesion between the bituminous material and the substance is too insecure to endue under conditions of use, especially in the presence of water and particularly water vapor, for a satisfactory length of time. This difficulty with respect to the bonding or adhesion between the bituminous material and the substance or object coated therewith has been found to be an especially troublesome problem when the substance to be coated is hydrophilic in character, that is, preferentially wetted by water. For example, in the making of asphaltic compositions by coating a mineral aggregate with an asphalt for the surfacing of a highway, many aggregates are found to have a greater affinity for water than for the asphalt, that is, such aggregates are relatively hydrophilic. Hence, even when such aggregate is coated with the asphalt, water in vapor form has a tendency to permeate the asphalt to the surface of the aggregate and, saince the aggregate is hydrophilic, a water film intervenes between the asphalt and the aggregate, and in this manner tends to loosen and strip the asphaltic coating from aggregate of this character. Thus, because it is hydrophilic, such aggregate tends to become coated by the water, for which it has a greater affinity, instead of the asphalt. Thus it is apparent that to obtain a bond or adhesion of bituminous material, such as asphalt, to hydrophilic aggregate which will be secure and permanent, especially in the presence of water, particularly water vapor which is normally present in the atmosphere, is a major problem the solution of which is of inestimable value to the highway building industry alone, not to mention the value to numerous other industries.

Attempts, prior to this invention, have been made to solve this problem by the addition of various materials to an asphaltic emulsion, but such attempts have been found to be highly unsatisfactory in practice for various reasons, many of which are not well understood, but along which are the disadvantages that the material added has the undesirable effect of breaking down the emulsion or of being undesirably corrosive to metals with which the emulsion containing it may come in contact.

I have now found that by incorporating an alkali metal dichromate, particularly sodium and potassium dichromate and including ammonium and lithium dichromates, into a bituminous emulsion, particularly an asphaltic emulsion, the adhesion of the bituminous material in the emulsion for various objects, especially hydrophilic aggregate, is substantially and markedly increased.

Moreover, this highly desirable result is obtained without break-down of the emulsion, the resulting emulsion is not corrosive to metals with which it may come in contact, and there is no adverse effect upon the asphaltic material in the emulsion. These dichromates are effective to lower the pH of the emulsion but are usually not sufficiently severe in this respect to prevent emulsification or to break down the emulsion. Furthermore, in addition to such outstanding results with respect to the increased adhesiveness between the bituminous material, such as asphalt, and especially a hydrophilic object, such as hydrophilic aggregate, this new process as well as the resulting product has associated therewith the highly desirable new results of increase in drying rate and improved mixing ability of the emulsion. The process, although critically sensitive with respect to the significant variables involved, is nevertheless so effective and capable of a nicety of control in manufacture on a commercial scale so as to be highly desirable industrially.

Although the process of this invention is useful for and is directed to the treatment of those bituminous emulsions which are deficient in their ability to remain coated on or bonded to an object, especially a hydrophilic object, and particularly so deficient when subjected to the deteriorating action of water and which have poor drying rates and mediocre mixing ablity, it has been found especially useful and effective in such emulsions in which the emulsifying agent is an alkali metal salt of an organic acid, and particularly with a high molecular weight organic substance or compound, such as an alkali metal salt resulting from the reaction of a caustic alkali with certain acids in the asphalt itself, as is the case in the well-known Montgomerie or Braun emulsions, and preferably the molecular weight of the organic acid should be above about 300.

In some bituminous emulsions it may be desirable to use a stabilizing agent along with the dichromate salt, and this will usually be found to be the case with those emulsions with which a stabilizing agent is ordinarily used, as known in the art, such as, for example, the emulsions made by the well-known Montgomerie or Braun processes in which the asphalt is emulsified by means of a caustic solution. Any of the stabilizers suitable for ordinary purposes may be used, but those found best suited for the purpose of this invention are Vinsol Resin, Vinsol Resin saponified with caustic, blood, soya bean protein, and casein.

The term "Vinsol Resin" is a trade-mark registered by the Hercules Powder Company and is referred to herein to designate the resin disclosed in lines 31 to 45, column 1, page 1, of United States Letters Patent No. 2,114,393 to Fred H. Lane and more fully disclosed in United States Letters Patent No. 2,193,026 to Lucius C. Hall. Vinsol Resin is used as a stabilizing agent for bituminous emulsions, especially those quick-setting bituminous emulsions of the Montgomerie or Braun type. This resin may be added either as a slurry of Vinsol Resin in water or in the form of Vinsol Resin soap made by the saponification of the resin with sodium hydroxide, and this resin may be used as a stabilizing agent in the emulsions of the invention herein disclosed in each and every way, as disclosed in application for United States Letters Patent, Serial No. 209,065, filed May 20, 1938, by Walter D. Buckley, now U. S. Patent No. 2,256,886. Blood may be used as a stabilizer either after having been dried, as disclosed in United States Letters Patent No. 2,074,731 to Claude L. McKesson, or in the liquid form, preferably after having been highly agitated, and in liquid form may be used as a stabilizing agent in the emulsions of the invention herein disclosed in each and every way as disclosed in application for United States Letters Patent, Serial No. 294,504, filed September 12, 1939, by Walter D. Buckley and Edwin P. Bly, now U. S. Patent No. 2,372,653, issued April 3, 1945. Soya bean protein in the form of soya bean flour, in which the principal protein constituent is glycinin, is incorporated into bituminous emulsions as a stabilizer therefor, and this protein substance may be used as a stabilizing agent in the emulsions of the invention herein disclosed in each and every way as disclosed in application for United States Letters Patent, Serial No. 297,564 filed October 2, 1939, by Walter G. Cole and Walter D. Buckley, now U. S. Patent No. 2,336,468.

In the case of primary emulsions not containing stabilizing agents such as quick-setting emulsions of the Montgomerie or Braun type, this is, those in which the emulsifying agent is formed by the reaction of a caustic alkali with certain organic acids in the asphalt itself, it is preferred to add the dichromate during the process of emulsification which for the purposes of this invention is conducted preferably in accordance with the Braun process in which a stream of caustic solution is contacted with a stream of asphalt in a seed liquor batch of emulsion and the resulting emulsion formed is continuously drawn off, as disclosed by Patent No. 1,737,491 to Braun, and to add the dichromate by introduction in solution form (preferably 5 to 10% solution) at the point of juncture of the caustic solution and the asphalt, or sufficiently near this juncture that the dichromate does not effect too great a neutralization of the caustic solution prior to contact of the caustic solution with the asphalt, or the dichromate does not contact the emulsion after it has been formed, because this causes undesirable graininess or coagulation of this kind of emulsion. A high degree of agitation and dilute solution is preferred to prevent shot formation in this type of emulsion.

The proportion of dichromate salt to be incorporated into emulsions for the purposes of this invention may vary from about 0.05% to about 2% by weight of the emulsion, but the preferred working range is from about 0.1 to about 0.5%, and the optimum proportion for the best results with regard to increased adhesiveness, increased drying rate and improved mixing ability is about 0.5%. These proportions relate to an emulsion in which the bituminous material comprises from about 55 to 60% of the emulsion, and if the emulsion contains more or less bituminous material, an approximately proportional increase or decrease, respectively, in the proportion of dichromate added will usually be desirable. In some cases, especially when the emulsion has been treated with greater than about 0.5% of the dichromate, it has a tendency to set up a thixotropic gel structure, but this weak gel structure disappears upon even slight agitation, and therefore is not objectionable.

In accordance with the preferred embodiment of this invention, the dichromate salt is incorporated into a relatively stable emulsion, such as the type indicated above containing an organic colloid as a stabilizing agent or those inherently stable usually by virtue of the emulsifying agent used. The dichromate salt may be incorporated into the emulsion after the emulsion has been formed or at any convenient stage during its formation, it being preferred, however, to effect this incorporation upon a preformed emulsion. The strength of the solution preferably used may vary from about a 5 to about a 10% solution, and usually the higher the concentration of the salt the higher degree of agitation will be found desirable. In order to prevent local overconcentration of the dichromate salt, which apparently causes shot formation in the emulsion, it is usually desirable to use either a dilute solution of dichromate or to incorporate it with a high degree of agitation. It has been found preferable, however, to use a relatively strong solution in combination with a high degree of agitation. The crystal form of the salt may be used if incorporated into the emulsion with a high degree of agitation.

In such relatively unstable emulsions as the primary or quick-setting Montgomerie or Braun type of emulsion referred to above not containing a stabilizing agent, it has not been practicable to incorporate more than about 0.15% of the dichromate in the emulsion without rendering the resulting emulsion somewhat unstable in storage. When proportions up to about 0.15% are used, the emulsion is sufficiently stable in storage for practical purposes, but percentages up to about 0.3% render the emulsion subject to gelling or thickening in the course of a few weeks, this resulting gel structure not being the harmless thixotropic gel structure referred to above. However, even such an emulsion would, of course, be useful for the purposes of this invention if it did not have to be stored and could be used before such gelling or thickening occurred. To obtain an emulsion having more than about 0.15% of the dichromate, particularly the optimum proportion of about 0.5% and not subject to gelling or thickening in storage, it has been found desirable to also incorporate into the emulsion a stabilizing agent, and the stabilizing agents found especially suitable in combination with the dichromate salts are the organic colloid type, particularly Vinsol Resin, Vinsol Resin soap and such protein type stabilizers as blood and soya bean protein.

In order to determine the characteristics of adhesiviness, drying rate and mixing ability of asphaltic emulsions, the following tests are used:

*Adhesion Test:*—A 50-gram sample of a mixture consisting of 93% of ¼-inch to 10-mesh stone or gravel and 7% of emulsion, is stirred until thoroughly coated and is then cured at 200° F., until substantially at constant weight (approximately 24 hours). It is then placed in a 600-ml. Pyrex beaker containing 400 cc. of boiling distilled water, and the whole is boiled for three minutes, during continuous stirring with a ⅜-inch diameter glass rod, moved in a circular motion at a rate of 60 times per minute. The beaker and its contents are then removed from the flame and allowed to stand until ebullition has ceased. The water is then poured off and the aggregate dumped out of the beaker onto a piece of absorbent paper. When dry, the mixture is visually examined for loss of coating. The proportion of aggregate remaining coated is determined by an experienced operator by visual inspection. This test is a severe test for adhesiveness and is, in fact, far more severe than conditions usually encountered in practice, and provides a means of quantitatively measuring adhesiveness.

*Drying rate:*—One hundred grams of the emulsion to be tested is placed in a tared Pyrex dish, 77 mm. in inside diameter by 40 mm. in height, having a flat bottom and straight sides. The dish is placed in the center of a shallow pan about five inches in diameter and 50 grams of granular anhydrous calcium chloride is spread in the pan so that it surrounds the dish containing the emulsion. The entire unit is then placed in a constant temperature oven set at 100° F. At the end of exactly 96 hours, during which time the sample is not disturbed by stirring or excessive movement, the loss of weight of the emulsion is determined. The dehydration loss shall be expressed as the ratio of loss in this test in 96 hours to loss in the test for "residue at 163° C," which is the percentage of residue as determined by A. S. T. M. Standard Specifications D6-30, except that the determination of residue shall be the average of three 50-gram samples heated for three hours in a dish or beaker of not less than three inches in diameter and of sufficient depth to prevent overflow.

*Mixing ability:*—Fifty grams of high early strength Portland cement, conforming with the "fineness" requirements of A. S. T. M. Standard Specifications C74-36, are sieved through a No. 80 sieve and are placed in a tin having a capacity of approximately 500 cc. The emulsion to be tested is diluted with distilled water to a residue of 55%, as determined in the test for "Residue at 163° C.," previously described. One hundred cubic centimeters of the emulsion thus diluted are poured on the cement and stirred with a ½ inch steel rod sixty times during one minute. One hundred fifty cubic centimeters of distilled water is then added and stirring continued for three (3) minutes. Ingredients and apparatus shall be maintained at a temperature of approximately 77° F. during mixing. The mixture is poured through a tared 14-mesh iron wire sieve, rinsing until wash water is clear. The sieve is then placed in a tared shallow pan, heated until dry and weighed. The quantity of the material retained on the screen and in the pan is the part broken and is a measure of the mixing ability, and is rated by an experienced operator in such terms as, "poor," "fair," "good," "excellent," etc.

The following examples are given to illustrate the invention and it is not intended that the broad invention herein disclosed be limited to any of the specific details given in these illustrative examples:

*Example 1.*—Three asphaltic emulsions, designated as L-3RM, a fine aggregate mixing grade emulsion of S. C. 6 road oil, L-RM, a fine aggregate mixing grade emulsion of 95+ asphalt content road oil, and DRM, a fine aggregate mixing grade emulsion of D grade paving asphalt, each of the Braun or Montgomerie type, to each of which emulsions has been added 1½% of Vinsol Resin added in slurry form as a stabilizing agent for the emulsions, were treated by agitating various samples of each of these stabilized emulsions with a number of different proportions, based on the weight of the emulsions, of potassium dichromate (in 10% solution form) as indicated in the table below. The resulting emulsions were tested for adhesiveness on Louisiana slick gravel and Massachusetts rhyolite, known to be highly hydrophilic aggregates, tested for drying rate and mixing ability, and the results obtained are shown in the following table.

TABLE 1

*Asphaltic emulsions containing 1½% Vinsol Resin treated with potassium dichromate*

| Kind of emulsion treated | Percentage $K_2Cr_2O_7$ | Drying rate | Mixing ability | Adhesiveness | |
|---|---|---|---|---|---|
| | | | | Louisiana slick gravel | Massachusetts rhyolite |
| L-3RM | 0.0 | .632 | Poor (grainy) | 5 | 5 |
| Do | 0.1 | .663 | Fair | 5 | 5 |
| Do | 0.3 | .730 | Good | 20 | 10 |
| Do | 0.5 | .880 | Excellent (very smooth) | 60 | 20 |
| L-RM | 0.0 | .455 | Fair | 5 | 10 |
| Do | 0.1 | .550 | Good | 10 | 30 |
| Do | 0.3 | .620 | Good (very smooth) | 30 | 30 |
| Do | 0.5 | .876 | Excellent (very smooth) | 50 | 40 |
| DRM | 0.0 | .593 | Good | 10 | 30 |
| Do | 0.1 | .682 | ___do___ | 20 | 40 |
| Do | 0.3 | .750 | Very good (better than 0.1) | 80 | 75 |
| Do | 0.5 | .872 | Very good (smooth) | 90 | 80 |

From the results in Table 1 above it is readily apparent that the drying rate, mixing ability and adhesiveness of each of the asphaltic emulsions treated with potassium dichromate were substantially improved by the treatment, and that the best results were obtained with about 0.5% of potassium dichromate. It was also observed that the potassium dichromate inhibited a settling of the Vinsol Resin from the emulsion stabilized therewith, which settling is sometimes experienced with an emulsion stabilized with Vinsol Resin.

*Example 2.*—Asphaltic emulsions as in Example 1, but stabilized with Vinsol Resin soap (Vinsol Resin reacted with sodium hydroxide), were treated with potassium dichromate solutions, as in Example 1 above, and the addition thereof was found to increase the adhesiveness of the asphalt for hydrophilic aggregate, increase the drying rate and improve the mixing ability.

*Example 3.*—Asphaltic emulsions as in Example 1, but stabilized with blood, were treated with potassium dichromate solutions as in Example 1, and the addition thereof was found to increase the adhesiveness for hydrophilic aggregate, increase the drying rate and improve the mixing ability.

*Example 4.*—Asphaltic emulsions as in Example 1, but stabilized with soya bean flour, were treated with potassium dichromate, and the addition thereof was also found to improve the adhesiveness of the asphalt for hydrophilic aggregate, increase the drying rate and improve the mixing ability.

*Example 5.*—A relatively stable asphaltic emulsion, in which the emulsifying agent was a saponified resinous material extracted from waste sulfite liquor, the essential constituent of which is believed to be abietic acid, was treated with varying proportions of potassium dichromate as in Example 1, and the addition thereof was found to improve the adhesiveness of the asphalt for hydrophilic aggregate, increase the drying rate and improve the mixing ability.

Instead of potassium dichromate, sodium dichromate may be used for the purposes of this invention, and lithium and ammonium dichromates may also be used, but they are, of course, more costly. It has also been found that instead of the alkali metal dichromates, the corresponding chromate salts may be used with good results, and although the alkali metal chromates, particularly sodium and potasium chromates, are better with regard to improvement of adhesiveness, increase in drying rate and improvement in mixing ability than anything else heretofore known in the art, it must be distinctly emphasized that the dichromate is outstandingly superior to the chromate. In general, it has been found that the dichromate is from one and a third to one and a half times as effective for the purposes of this invention than the chromate. Other alkali metal salts of oxy-acids of chromium may be used for the purposes of this invention, and hence, more broadly stated, this invention contemplates the use of an alkali metal salts of an oxy-acid of chromium.

Although it is not desired to be limited to any theoretical explanation, it appears that when the salt used is in the dichromate form a reaction may occur between alkali in the emulsion and the dichromate which is in the nature of a neutralizing reaction and has the effect of changing or partially changing the dichromate to the chromate form. Nevertheless, regardless of what may happen to the dichromate after it has been incorporated into the emulsion, this form of the salt gives far superior results than the chromate form for the purposes of this invention, especially with respect to improvement in adhesiveness.

The term "bituminous emulsions," as herein used, embraces emulsions of asphalt, pitch, tar, oil and other similar hydrocarbon products which are normally solid, semi-solid, highly viscous, or fluid, or mixtures thereof.

In the disclosure of my invention, reference is made to specific examples to illustrate the best ways known of making and using it; however, the invention sought to be protected by Letters Patent of the United States is not to be construed to be limited to the specific details of such examples, but includes variations and modifications within the scope and extent of the appended claims.

I claim:

1. An aqueous asphalt emulsion of the oil-in-water type, comprising a small amount, sufficient to increase substantially the capacity of the asphalt to adhere to hydrophilic aggregate in the presence of water, of an alkali metal dichromate, said emulsion being stabilized against breakdown by said small amount of alkali metal dichromate by means of an organic stabilizing agent.

2. The emulsion of claim 1, wherein said alkali metal dichromate is sodium dichromate.

3. A liquid, free flowing, neutral to alkaline aqueous mixing type asphalt emulsion of the oil-in-water type, said emulsion being suitable for use as a road binder, being stabilized by an organic stabilizing agent and containing a small amount, sufficient to increase substantially the capacity of the asphalt to adhere to hydrophilic aggregate in the presence of water, of sodium dichromate.

4. A liquid, free flowing, neutral to alkaline aqueous mixing type asphalt emulsion of the oil-in-water type, said emulsion being suitable for use as a road binder, being stabilized by an organic stabilizing agent and containing about 0.1 to 2 per cent by weight based on the finished emulsion of sodium dichromate.

5. An alkaline aqueous asphalt emulsion of the oil-in-water type stabilized by a small amount, sufficient to enable the emulsion to pass the A. S. T. M. D244-42 cement mixing test, of alkali metal soap of Vinsol Resin, and containing an alkali metal dichromate in small amount sufficient to increase substantially the capacity of the asphalt to adhere to Massachusetts rhyolite.

6. The emulsion of claim 5, wherein said alkali metal dichromate is sodium dichromate.

7. An alkaline aqueous asphalt emulsion of the oil-in-water type stabilized by a small amount, sufficient to enable the emulsion to pass the A. S. T. M. D244-42 cement mixing test, of protein stabilizer, and containing an alkali metal dichromate in small amount sufficient to increase substantially the capacity of the asphalt to adhere to Massachusetts rhyolite.

8. The emulsion of claim 7, wherein said alkali metal dichromate is sodium dichromate.

9. A method of producing an aqueous, oil-in-water type emulsion of a bitumen which normally lacks the capacity to adhere strongly to hydrophilic aggregate in the presence of water, which comprises emulsifying the bitumen directly in water to produce an oil-in-water type emulsion, stabilizing the emulsion by means of an organic stabilizing agent against breakdown caused by alkali metal dichromate up to 2 per cent by weight based on the finished emulsion, and incorporating in the emulsion a small amount of alkali metal dichromate sufficient to increase substantially the capacity of the bitumen to adhere to hydrophilic aggregate in the presence of water.

10. An aqueous asphalt emulsion comprising an oil-in-water type emulsion of an asphalt which is normally incapable of firmly adhering to hydrophilic aggregate in the presence of water, said emulsion containing a small amount, sufficient to increase substantially the capacity of the asphalt to adhere to hydrophilic aggregate in the presence of water, of an alkali metal dichromate, said emulsion being stabilized in the presence of said small amount of alkali metal dichromate by a stabilizing agent selected from the group consisting of water-soluble stabilizing agents and dilute aqueous alkali soluble stabilizing agents.

11. A method of producing an aqueous, oil-in-water type asphalt emulsion comprising emulsifying the asphalt directly in water to produce an oil-in-water type emulsion, stabilizing the emulsion by means of an organic stabilizing agent against breakdown caused by sodium dichromate up to 2 per cent by weight based on the finished emulsion, and incorporating in the emulsion after it has been formed, about 0.1 to 2 per cent by weight based on finished emulsion of sodium dichromate.

12. In a process of coating hydrophilic aggregate with asphalt, wherein the oil-in-water emulsion of asphalt is applied to the aggregate, the improvement comprising applying to the aggregate an oil-in-water emulsion of asphalt containing a small amount, sufficient to increase substantially the adhesiveness of the asphalt to the aggregate, of an alkali metal dichromate.

13. In a process of coating hydrophilic aggregate with asphalt, wherein the oil-in-water emulsion of asphalt is applied to the aggregate, the improvement comprising applying to the aggregate an oil-in-water emulsion of asphalt containing a small amount, sufficient to increase substantially the adhesiveness of the asphalt to the aggregate, of potassium dichromate.

14. In a process of coating hydrophilic aggregate with asphalt, wherein the oil-in-water emulsion of asphalt is applied to the aggregate, the improvement comprising applying to the aggregate an oil-in-water emulsion of asphalt containing a small amount, sufficient to increase substantially the adhesiveness of the asphalt to the aggregate, of sodium dichromate.

15. In a process of coating hydrophilic aggregate with asphalt, wherein an oil-in-water emulsion of asphalt is applied to the aggregate, the improvement comprising applying to the aggregate an oil-in-water emulsion of asphalt containing about 0.1 to 0.5% by weight based on the emulsion of an alkali metal dichromate.

16. In a process of coating hydrophilic aggregate with asphalt, wherein an oil-in-water emulsion of asphalt is applied to the aggregate, the improvement comprising applying to the aggregate an oil-in-water emulsion of asphalt containing about 0.1 to 0.5% by weight based on the emulsion of sodium dichromate.

17. The emulsion of claim 1, wherein the alkali metal dichromate is present in the amount of about 0.1 to 0.5% by weight based on finished emulsion.

PAUL E. McCOY.